US009311114B2

(12) United States Patent
Ramchandran et al.

(10) Patent No.: US 9,311,114 B2
(45) Date of Patent: Apr. 12, 2016

(54) DYNAMIC DISPLAY OVERLAY

(71) Applicant: International Business Machines Corporation, Armonk, NY (US)

(72) Inventors: Puthukode G. Ramchandran, Austin, TX (US); Shunguo Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 335 days.

(21) Appl. No.: 14/105,584

(22) Filed: Dec. 13, 2013

(65) Prior Publication Data

US 2015/0170348 A1    Jun. 18, 2015

(51) Int. Cl.
*G06F 9/44* (2006.01)
*G06F 3/0481* (2013.01)

(52) U.S. Cl.
CPC ............ *G06F 9/4443* (2013.01); *G06F 3/0481* (2013.01); *G09G 2320/0242* (2013.01); *G09G 2360/144* (2013.01)

(58) Field of Classification Search
CPC .............. G09G 2320/0666; G09G 2320/0626; G09G 2360/144; G09G 5/02; G09G 3/3406; G09G 3/3413; G09G 2320/0242; G09G 2320/0693; G09G 2360/145; G09G 3/2003; G09G 2320/0233; G09G 2320/041; G09G 2320/0646; G09G 2340/14; G09G 3/342; G09G 5/026; G09G 2320/02
See application file for complete search history.

(56) References Cited

U.S. PATENT DOCUMENTS

| 8,165,808 | B2 | 4/2012 | Scheibe |
| 8,303,309 | B2 | 11/2012 | Hoffmann et al. |
| 8,306,515 | B2 | 11/2012 | Ryu et al. |
| 8,970,571 | B1* | 3/2015 | Wong ................. G02B 27/0101 345/207 |
| 2006/0197781 | A1 | 9/2006 | Arutunian |
| 2010/0201709 | A1* | 8/2010 | Yang ................ H04N 21/44008 345/629 |

(Continued)

FOREIGN PATENT DOCUMENTS

EP            2374093 A1     10/2011

OTHER PUBLICATIONS

Jang, Y.G.; Implementation of Virtual Colored Overlays in Mobile Devices for People with Scotopic Sensitivity Syndrome, International Journal of Computer Science and Network Security, 13(14), 13-18: See pp. 16-17, vol. 13 No. 4, Apr. 2013.

(Continued)

*Primary Examiner* — Jeffrey Chow
(74) *Attorney, Agent, or Firm* — Garg Law Firm, PLLC; Rakesh Garg; William J. Stock (57) ABSTRACT

A method, system, and computer program product for creating a virtual display overlay are provided in the illustrative embodiments. A first value of a visual characteristic of a presentation and an ambient condition are detected at a first time, the ambient condition changes a user's perception of the first value of the visual characteristic to a perceived value of the visual characteristic. A difference is identified between the perceived value of the visual characteristic and a preference specified by a user. The virtual display overlay having an adjustment value is generated responsive to the identifying. the adjustment value when applied to the perceived value of the visual characteristic reduces the difference to less than a tolerance threshold. The virtual display overlay is displayed on the display device such that the virtual display overlay covers the presentation.

20 Claims, 6 Drawing Sheets

(56) References Cited

U.S. PATENT DOCUMENTS

| | | |
|---|---|---|
| 2011/0128288 A1 | 6/2011 | Petrou et al. |
| 2012/0274808 A1 | 11/2012 | Chong et al. |
| 2013/0007643 A1 | 1/2013 | Edwards et al. |
| 2013/0055116 A1 | 2/2013 | Kern et al. |
| 2013/0169686 A1 | 7/2013 | Saunders |
| 2013/0194437 A1 | 8/2013 | Osman |
| 2013/0235069 A1* | 9/2013 | Ubillos .............. G09G 5/026 345/594 |
| 2014/0368530 A1* | 12/2014 | James .............. G06Q 30/0643 345/593 |
| 2015/0070337 A1* | 3/2015 | Bell .............. G09G 3/2003 345/207 |

OTHER PUBLICATIONS

Google, Use Overlays to layer your content on the map, 2013.

Dojo; dojox/mobile/Overlay—The Dojo Toolkit—Reference Guide; http://dojotoolkit.org/reference-guide/1.9/dojox/mobile/Overlay.html; © Copyright 2005-2012, Dojo Foundation. Created using Sphinx 1.1.3.

* cited by examiner

DYNAMIC DISPLAY OVERLAY

TECHNICAL FIELD

The present invention relates generally to a method, system, and computer program product for improving visual displays on devices. More particularly, the present invention relates to a method, system, and computer program product for a dynamic display overlay.

BACKGROUND

Almost all data processing systems include some type of a display device (display) to present visual information to a user. Mobile devices, such as smartphones, tablet computers, and the like, are also examples of data processing systems with built-in display devices.

Visual presentation of information is user-dependent. The same visual information presented in the same manner, e.g., using the same colors and contrasts, to different users can result in different levels of perceptions. For example, a user with some degree of color blindness may miss some color-coded information, a user with visual accessibility needs may miss some information in small fonts, and a user with other visual impairments may not be able to perceive the information being communicated using low-contrast shading or colors.

Presently, various operating systems include accessibility configurations to address such problems. For example, a user can configure an accessibility parameter in an operating system (OS) such that all presentations on the associated display device are of a specific contrast level, color depth, font size, or resolution.

Presently, some software applications allow a user to configure the interface presented by those specific applications for accessibility or user-preference purposes. For example, a user can configure a specific application such that the interface presented by that specific application is in a certain color scheme or font size.

SUMMARY

The illustrative embodiments provide a method, system, and computer program product for a dynamic display overlay. An embodiment includes a method for creating a virtual display overlay. The embodiment detects, at a first time, a first value of a visual characteristic of a presentation, the presentation being sent to a display device from an application executing in a data processing system associated with the display device. The embodiment detects, at the first time, an ambient condition, wherein the ambient condition changes a user's perception of the first value of the visual characteristic to a perceived value of the visual characteristic. The embodiment identifies a difference between the perceived value of the visual characteristic and a preference specified by a user. The embodiment generates, using a processor, responsive to the identifying, the virtual display overlay having an adjustment value, wherein the adjustment value when applied to the perceived value of the visual characteristic reduces the difference to less than a tolerance threshold. The embodiment displays the virtual display overlay on the display device such that the virtual display overlay covers the presentation.

Another embodiment includes a computer usable program product comprising a computer usable storage device including computer usable code for creating a virtual display overlay. The embodiment further includes computer usable code for detecting, at a first time, a first value of a visual characteristic of a presentation, the presentation being sent to a display device from an application executing in a data processing system associated with the display device. The embodiment further includes computer usable code for detecting, at the first time, an ambient condition, wherein the ambient condition changes a user's perception of the first value of the visual characteristic to a perceived value of the visual characteristic. The embodiment further includes computer usable code for identifying a difference between the perceived value of the visual characteristic and a preference specified by a user. The embodiment further includes computer usable code for generating, using a processor, responsive to the identifying, the virtual display overlay having an adjustment value, wherein the adjustment value when applied to the perceived value of the visual characteristic reduces the difference to less than a tolerance threshold. The embodiment further includes computer usable code for displaying the virtual display overlay on the display device such that the virtual display overlay covers the presentation.

Another embodiment includes a data processing system for creating a virtual display overlay. The embodiment further includes a storage device including a storage medium, wherein the storage device stores computer usable program code. The embodiment further includes a processor, wherein the processor executes the computer usable program code. The embodiment further includes computer usable code for detecting, at a first time, a first value of a visual characteristic of a presentation, the presentation being sent to a display device from an application executing in a data processing system associated with the display device. The embodiment further includes computer usable code for detecting, at the first time, an ambient condition, wherein the ambient condition changes a user's perception of the first value of the visual characteristic to a perceived value of the visual characteristic. The embodiment further includes computer usable code for identifying a difference between the perceived value of the visual characteristic and a preference specified by a user. The embodiment further includes computer usable code for generating, using a processor, responsive to the identifying, the virtual display overlay having an adjustment value, wherein the adjustment value when applied to the perceived value of the visual characteristic reduces the difference to less than a tolerance threshold. The embodiment further includes computer usable code for displaying the virtual display overlay on the display device such that the virtual display overlay covers the presentation.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that presently, visual accessibility is largely an all or nothing proposition. A user who configures one or more OS level accessibility parameters receives that accessibility adjustment for everything that is presented on the display.

Under an OS level visual accessibility adjustment, the same adjustment is applied to all presentations on the display. The illustrative embodiments recognize that a user may not want all presentations to be adjusted the same way—e.g., all colors adjusted to grayscale, all contrast set to high, all fonts set to size 24, and so on.

Furthermore, the illustrative embodiments recognize that the OS based visual accessibility adjustments are static, in that the adjustments do not change with the visual information being presented on the display. For example, if an OS based visual accessibility parameter is set to change a 32-bit color scheme to a 16-bit color scheme, all presentations on the display will have their color schemes changed to 16-bit color scheme, all the time, regardless of whether the loss of color resolution also causes loss of information. For example, the user cannot specify that the color scheme should be changed to 16-bit when all visual information presented in 32-bit can be represented in 16-bit color in a loss-less manner. The static choices available to the user are to change everything, or change nothing.

As another example, suppose that a user prefers warm colors, and accordingly an OS based visual accessibility parameter is set to apply warmth to the presentation on the display. The OS based visual accessibility adjustments select a static shade of yellow, and overlay that static shade to create the desired level of warmth.

Presently, that static shade of yellow does not change even when a particular presentation on the display is already warm enough according to the user's preference, ambient light is yellow, ambient temperature is warmer than a threshold to make warm colors undesirable, or when some other conditions warrant a change in the static shade of yellow. That static shade of yellow only changes when the OS based visual accessibility parameter value is changed.

The illustrative embodiments also recognize that when the user does not want such overarching static display adjustments, the user is limited to accessibility features made available by particular applications for their corresponding visual presentations. For example, a spreadsheet application may allow selecting a high-contrast color scheme for the spreadsheet presentations, but a calculator application may include no such adjustment. A text editor may allow selecting a large default font or zoom level, but a database application may not include any controls for font size or zoom level adjustments.

The illustrative embodiments further recognize, as with OS based visual accessibility adjustments, such application-specific visual accessibility adjustments are also static. Once defined, the specific application always applies the same adjustments regardless of any resulting loss of visual information, conflict with presentations belonging to other applications, conditions that offset some or all of the adjustment that may be needed to achieve the same result, and regardless of many other such factors. As with OS based visual accessibility parameters, any change desired in the adjustments is only achieved by changing the application-specific visual accessibility parameter from one static value to another static value.

The illustrative embodiments used to describe the invention generally address and solve the above-described problems and other problems related to adjusting visual characteristics of presentations on display devices. The illustrative embodiments provide a method, system, and computer program product for a dynamic display overlay.

An embodiment detects the visual information presented or about to be presented on the display at a given time. For example, the embodiment detects that three different applications are presenting three differently sized and differently colored interfaces at three different coordinates on different portions of the display.

The embodiment identifies a set of visual preferences specified by the user of the display. The embodiment computes different adjustments to be applied to the differently sized and differently colored interfaces at different coordinates on different portions of the display. For example, assume that the user prefers red colors to be of shade HyperText Markup Language (HTML) color #FF0505. The embodiment determines that a first presentation from one application is using HTML color #6E0606—a shade of red—in one portion of the first presentation, and a second presentation from another application is using HTML color #F2A9A9—another shade of red—in another portion of the second presentation. The embodiment computes that at the given time of the first and second presentations, at their respective portions, two different overlays have to be applied to achieve the resulting preferred color #FF0505. Accordingly, dynamically in response to the presentation on the display at a given time, the embodiment computes a first overlay that adjusts the portion of the first presentation by #90FEFF, and a second overlay that adjusts the portion of the second presentation by #C5B5C.

An embodiment further identifies a set of conditions that affect achieving the user-preferred visual preferences. For example, using a sensor, the embodiment determines a color or temperature of the ambient light. The embodiment modifies one or more overlays at one or more portions of the display to account for the color or temperature of the ambient light at the time.

For example, consider the above example first overlay of adjustment value #90FEFF. Assume that the embodiment measures the ambient light temperature to be 2500 Kelvin, which equates to approximately #F2F5A9 shade of yellow. Given a measured intensity of the ambient light at the time, the embodiment determines that color #6E0606 supplied by the first application is perceptible to the user as color #6A120E on the display. Accordingly, in a dynamic response to a condition at a given time, the embodiment changes the first overlay from #90FEFF to #94F2F7 so that the desired color #FF0505 is perceived by the user under the given conditions and for the given visual information presented at a give time.

An embodiment further tracks the changes occurring on the display and in ambient conditions that affect the visual perception of the visual information being presented on the display. For example, if the first application changes the color in the first portion of the first interface at a second time, the embodiment changes the adjustment value of the first overlay accordingly to maintain the desired perceived color of the first portion. As another example, if the ambient light changes at a second time, the perceived color of the first portion also changes. Accordingly, the embodiment changes the adjustment value of the first overlay to maintain the desired perceived color of the first portion.

The example presentations, portions, colors, ambient conditions, portions, colors, ambient conditions, visual aspects or attributes, and adjustments are not intended to imply any limitation on the illustrative embodiments. From this disclosure, those of ordinary skill in the art will be able to conceive many other presentations, portions, colors, ambient conditions, visual aspects or attributes, adjustments, and other factors for creating a similarly usable dynamic display overlay and the same are contemplated within the scope of the illustrative embodiments. Single color adjustment by an overlay is used only as an example for the clarity of the description and not to imply a limitation on the illustrative embodiments. An overlay according to an embodiment can include several color adjustments or other visual characteristics adjustments in different portions, depending upon the artifacts of the presentation being overlaid.

The illustrative embodiments are described with respect to certain data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
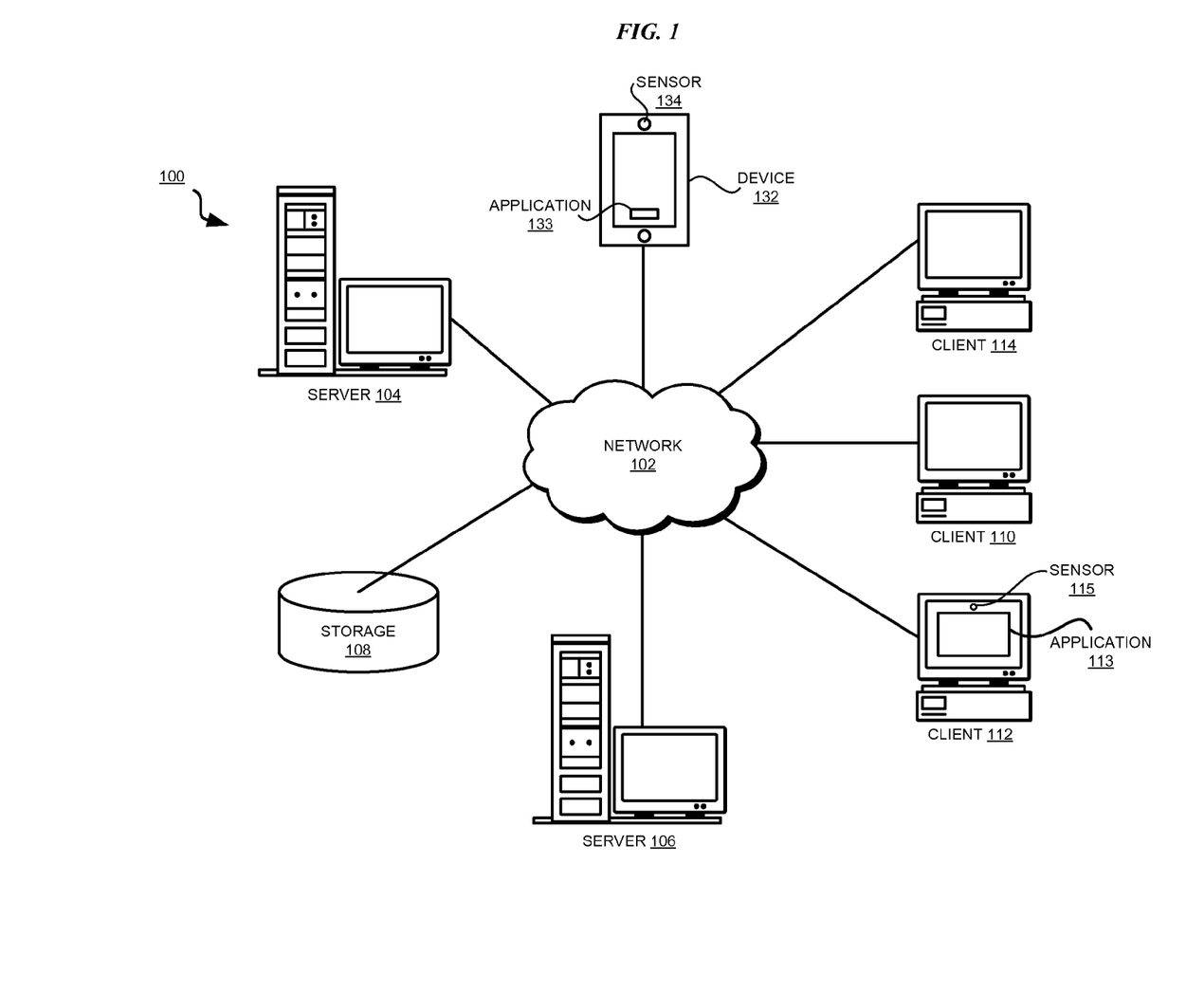
FIG. 1 depicts a block diagram of a network of data processing systems in which illustrative embodiments may be implemented.
Figure 2:
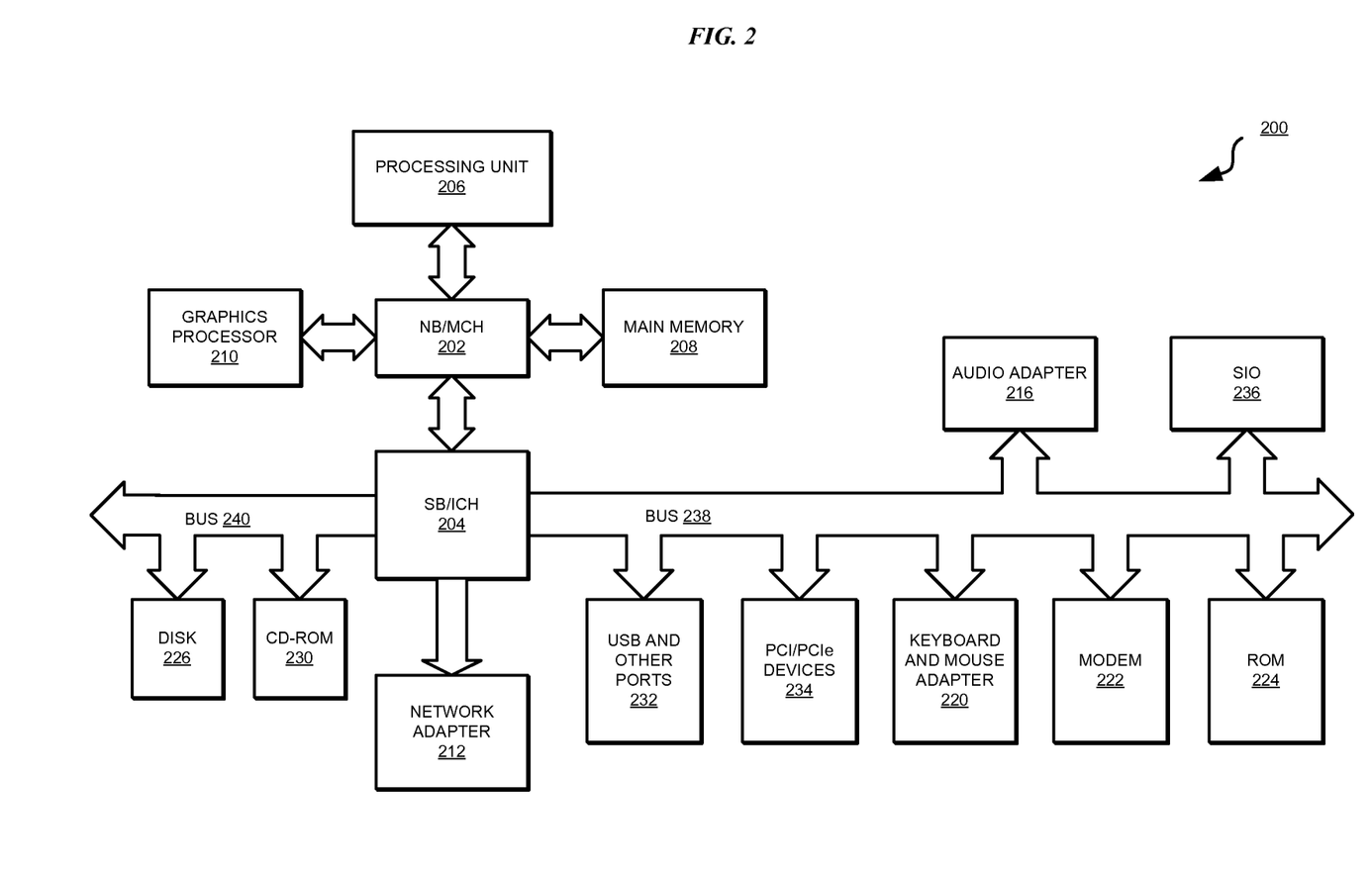
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of data processing systems in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any data processing system or device in data processing environment 100. Clients 110, 112, and 114 also couple to network 102. A data processing system, such as server 104 or 106, or client 110, 112, or 114 may contain data and may have software applications or software tools executing thereon.

In addition, device 132 may be a data processing system in the form of a mobile device. Device 132 is able to communicate with network 102 using wireless communication 120.

Only as an example, and without implying any limitation to such architecture, FIG. 1 depicts certain components that are usable in an example implementation of an embodiment. Servers 104 and 106, and clients 110, 112, 114, are depicted as servers and clients only as example. Data processing systems 104, 106, 110, 112, and 114 also represent example nodes in a cluster, partitions, and other configurations suitable for implementing an embodiment. For example, Device 132 is any suitable mobile computing platform, for example, a smartphone, tablet computer, a portable data processing device, or a wearable computing device. Device 132 includes application 133, which implements an embodiment described herein. Sensor 134 is an example sensor usable to detect and measure an ambient condition. Device 132 can include any number or type of sensors in the manner of sensor 134, to detect and measure various ambient conditions. Client 112 similarly includes application 113, which implements an embodiment described herein. Sensor 115 is an example sensor usable to detect and measure an ambient condition. Client 112 can include any number or type of sensors in the manner of sensor 115, to detect and measure various ambient conditions.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

Servers 104 and 106, storage unit 108, and clients 110, 112, and 114 may couple to network 102 using wired connections, wireless communication protocols, or other suitable data connectivity. For example, a cluster typically has multiple network types, such as IP networks, direct connections of machines via packets exchange implemented by storage protocols (Fibre Channel, SCSI), serial links, and message exchange via writing and reading packets to shared storage such as a hard disk drive. For performance reasons, in sending client traffic, an IP network is given precedence. Furthermore, a given network type may not connect to all nodes in a cluster. For instance, a cluster may span machines located at two geographically distant sites. For the long distance connection, Ethernet may be the preferred connection, and within a geographical location, a direct connection may be preferable. Additionally, within a geographical location, additional non- IP networks, such as Fibre channel or serial connections may be used within the scope of the illustrative embodiments.

Clients 110, 112, and 114 may be, for example, personal computers, network computers, thin clients, or industrial control systems. In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another, and encompasses components including but not limited to IP and SAN components. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), a wide area network (WAN), or mobile ad hoc network (MANET). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104, server 106, or client 112 in FIG. 1, or another type of device in which computer usable program code or instructions implementing the processes of the illustrative embodiments may be located for the illustrative embodiments. Data processing system 200 is also representative of a device, such as device 132 in FIG. 1 in which computer usable program code or instructions implementing the processes of the illustrative embodiments may be located for the illustrative embodiments. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors and may be implemented using one or more heterogeneous processor systems. Graphics processor 210 may be coupled to NB/MCH 202 through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Program instructions for the operating system, the object-oriented programming system, the processes of the illustrative embodiments, and applications or programs, including applications 133 and 113 in FIG. 1, are located on one or more storage devices, such as hard disk drive 226 or CD-ROM 230, and may be loaded into at least one of one or more memories, such as main memory 208, read only memory 224, or one or more peripheral devices, for execution by processing unit 206. Program instructions may also be stored permanently in non-volatile memory and either loaded from there or executed in place. For example, a program code according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA) or another mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
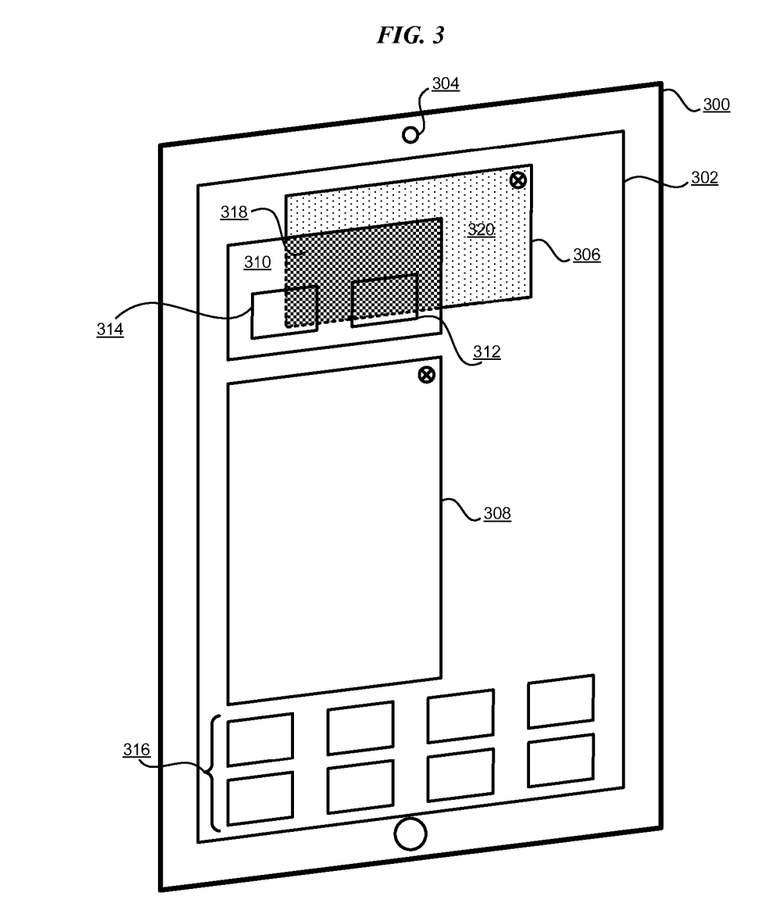
FIG. 3 depicts a block diagram of a presentation on a display that can be modified by using an illustrative embodiment.

With reference to FIG. 3, this figure depicts a block diagram of a presentation on a display that can be modified by using an illustrative embodiment. Device 300 is an example of device 132 or client 112 in FIG. 1. Device 300 includes display 302 and any number or type of sensor 304. Sensor 304 is an example of sensor 134 or sensor 115 in FIG. 1.

Only as an example to describe the operation of an embodiment, and without implying any limitations there from, assume that several applications, including an operating system, are executing on device 300. For example, presentation 306 is an interface presented by application "A", presentation 308 is an interface presented by application "B", and presentation 310 is an interface presented by application "C". Some presentations can include additional presentations artifacts, such as buttons, pop-up windows, tabs, controls, fields, and the like. Artifacts 312 and 314 in presentation 310 are examples of such artifacts.

Another application, for example the operating system or a skin application, can present additional presentations on display 302. Artifacts 316 are examples of such presentations, such as for launching various applications or switching therebetween.

Furthermore, the presentations of various applications can overlap one another, or otherwise interfere with one another. For example, presentation 310 partially overlaps presentation 306. Portion 318 is a portion of presentation 306 that is covered, for example, translucently, by presentation 310. Portion 320 of presentation 306 is not covered. Overlapping presentations can affect visual characteristics of one or both presentations in the overlapped portions. Even without an overlap, mere proximity of presentations with drastically different visual characteristics can be visually bothersome to some users.

Some examples of the visual characteristics (visual aspects, visual attributes) of a presentation include color, tone, texture, fill, shade, contrast, hue, saturation, opacity, transparency, translucency, weight, and transition. An embodiment described herein can be used to adjust a value of one or more visual characteristics of a presentation, or portion thereof. An embodiment can apply different adjustments of the same visual characteristic, different adjustments of different visual characteristics, or same adjustment to different visual characteristics, to different portions of a presentation on a display, to different presentations on the display, or a combination thereof. Furthermore, the adjustments themselves, and/or the visual characteristics, the portions, and the presentations to which the adjustments are applied, change dynamically over time in response to changes in the presentations by their respective applications, ambient conditions, user-preferences, or a combination thereof. Additionally, in one embodiment, the dynamic changes occur without user intervention.

Figure 4:
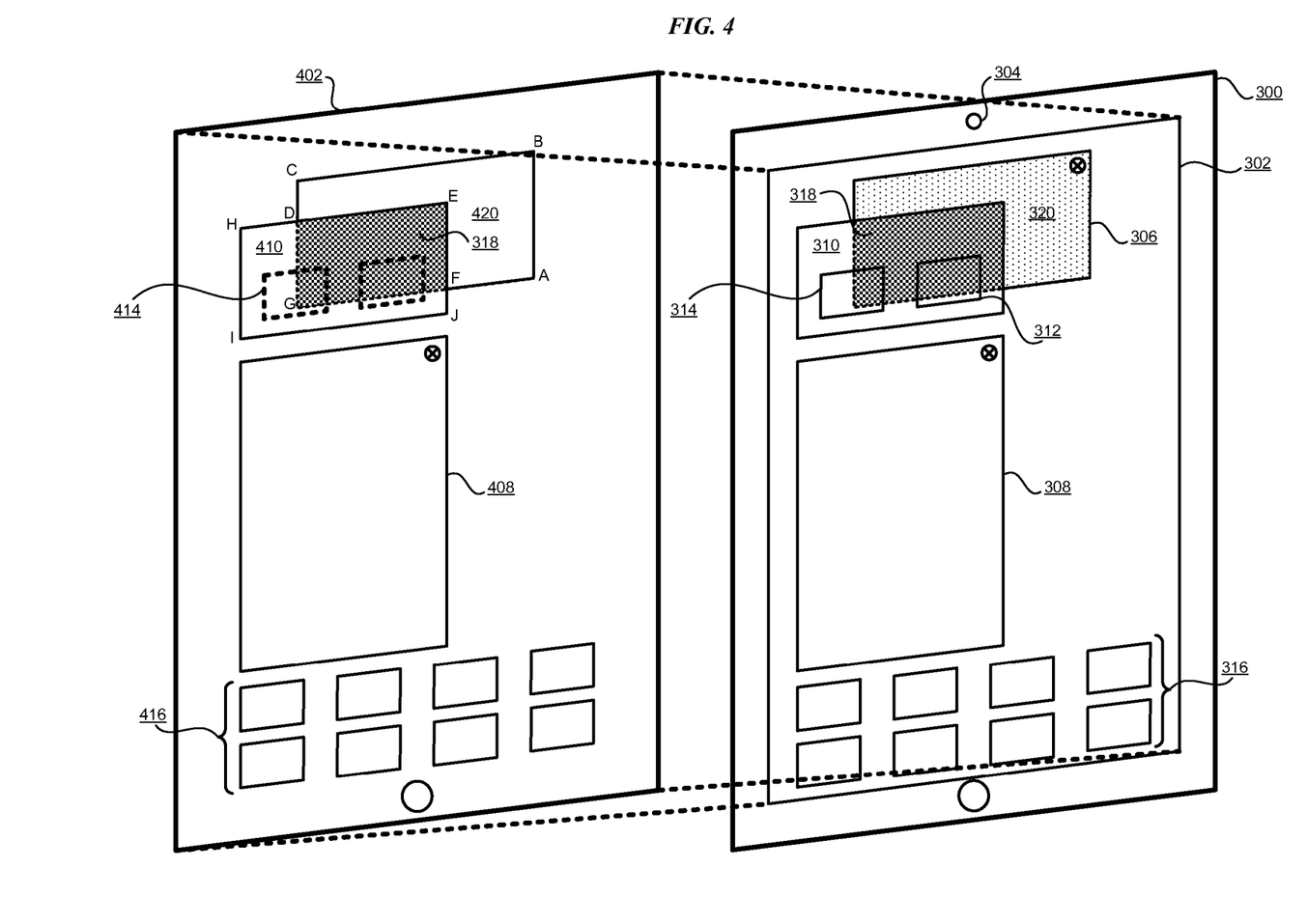
FIG. 4 depicts a block diagram of a dynamic display overlay in accordance with an illustrative embodiment.

With reference to FIG. 4, this figure depicts a block diagram of a dynamic display overlay in accordance with an illustrative embodiment. Overlay 402 is a dynamic display overlay according to an embodiment, and overlays all or part of display 302 of FIG. 3.

Overlay 402 is shown as a single overlay covering the entire area of display 302 only as an example. Overlay 402 can include several overlays, each covering a portion of display 302, collectively covering less than the entire area of display 302, or overlapping with one or more overlays within the scope of the illustrative embodiments.

In one embodiment, an overlay covers an entire presentation. For example, overlay 402 includes overlay 408. Overlay 408 is of dimensions that approximate the dimensions of presentation 308. Overlay 408 is positioned at coordinates that approximate the coordinates of presentation 308 such that presentation 306 is completely overlaid.

In another embodiment, an overlay partially covers a presentation. For example, overlay 402 includes overlay 420. Overlay 420 (represented by shape ABCDEF) is of dimensions that approximate the dimensions of presentation portion 320. Overlay 420 is positioned at coordinates that approximate the coordinates of presentation portion 320 such that presentation portion 320 is completely overlaid. Similarly, overlay 418 (represented by shape DEFG) has dimensions and coordinates approximating portion 318. Overlay 410 (represented by shape DHIJFG) overlays that portion of presentation 310 which does not cover presentation 306.

In one embodiment, a single overlay comprises overlays 420 (represented by ABCG), and another overlay (represented by EHIJ) comprises overlay 410. Overlays ABCG and EHIF each includes overlapped area 318.

Overlay 414 overlays artifact 314. In one embodiment, overlay 414 is a part of overlay 410. In another embodiment, overlay 410 excludes the area of overlay 414, and such area is occupied by a separate overlay—overlay 414. Overlays 416 are a plurality of overlays, each overlay in the plurality independent of another, and adjusting a visual characteristic of a corresponding area of presentation 316.

Generally, where overlays overlap each other, or when two overlays cover a common area, an embodiment computes the visual characteristics adjustments for such that the overlapping areas achieve the visual result desired by a user.

Figure 5:
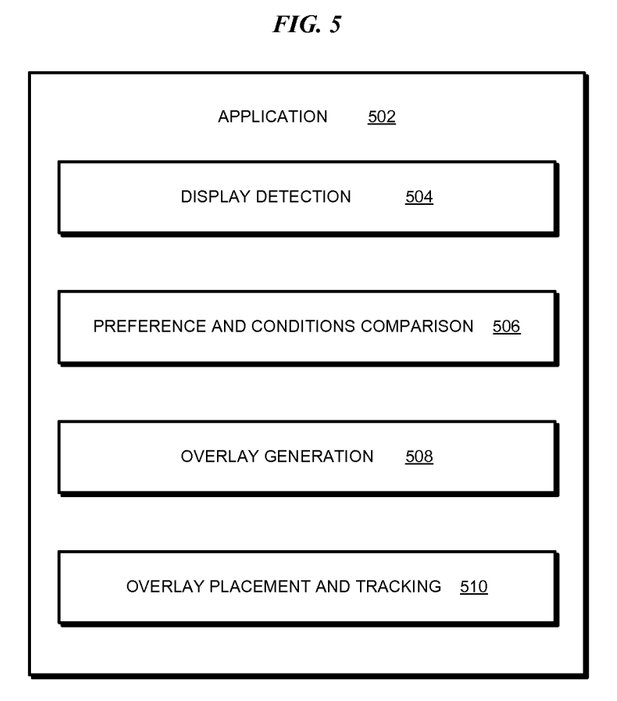
FIG. 5 depicts a block diagram of an application to create and manage a dynamic display overlay in accordance with an illustrative embodiment.

With reference to FIG. 5, this figure depicts a block diagram of an application to create and manage a dynamic display overlay in accordance with an illustrative embodiment. Application 502 is an example of application 133 or application 113 in FIG. 1.

Application 502 includes component 504 to detect the presentations on a given display, such as presentation 306 on display 302 in FIG. 3. In one embodiment, component 504 detects the presentations by taking a screenshot of the display and analyzing the screenshot. In another embodiment, component 504 reads a memory associated with a graphics processing circuit, where the graphics processing circuit composes an image in the memory for presenting on the display.

In one embodiment, component 504 detects a presentation after the presentation has been displayed on the display. In another embodiment, component 504 detects a presentation before the presentation has been displayed on the display, such as while the presentation is prepared in memory by the graphics processing circuit. In another embodiment, component 504 detects some presentations before they are displayed and some presentations after they are displayed on the display.

Component 506 compares the visual characteristics of a detected presentation with the preferences of the user. Component 506 computes the adjustment values for one or more visual characteristics of the presentation so that the adjustments bring the visual characteristics of the presentation within a threshold tolerance of a user-preference.

In one embodiment, component 506 also includes in the comparison one or more ambient conditions. Component 506 computes an adjustment by using not only a visual characteristic of the presentation but also an effect of the ambient condition on the visual characteristic so that the adjustments bring the visual characteristics of the presentation within a threshold tolerance of a user-preference under the given ambient condition.

Component 508 generates an overlay, such as overlay 408 in FIG. 4, according to the adjustments computed by component 506. Component 510 places the overlay generated by component 508 on the display. For example, component 510 determines the coordinates of the presentation to be overlaid and any offsets to over-cover or under-cover the presentation, and computes the coordinates for the overlay. Component 510 then positions the overlay at the computed coordinates.

Component 510 further tracks the changes in the presentation, presentation coordinates, ambient conditions or a combination thereof. Depending on the nature of the change, component 510 communicates with component 504, 506, 508, or a combination thereof, to recompute the overlay, reposition the overlay, or a combination thereof.

Figure 6:
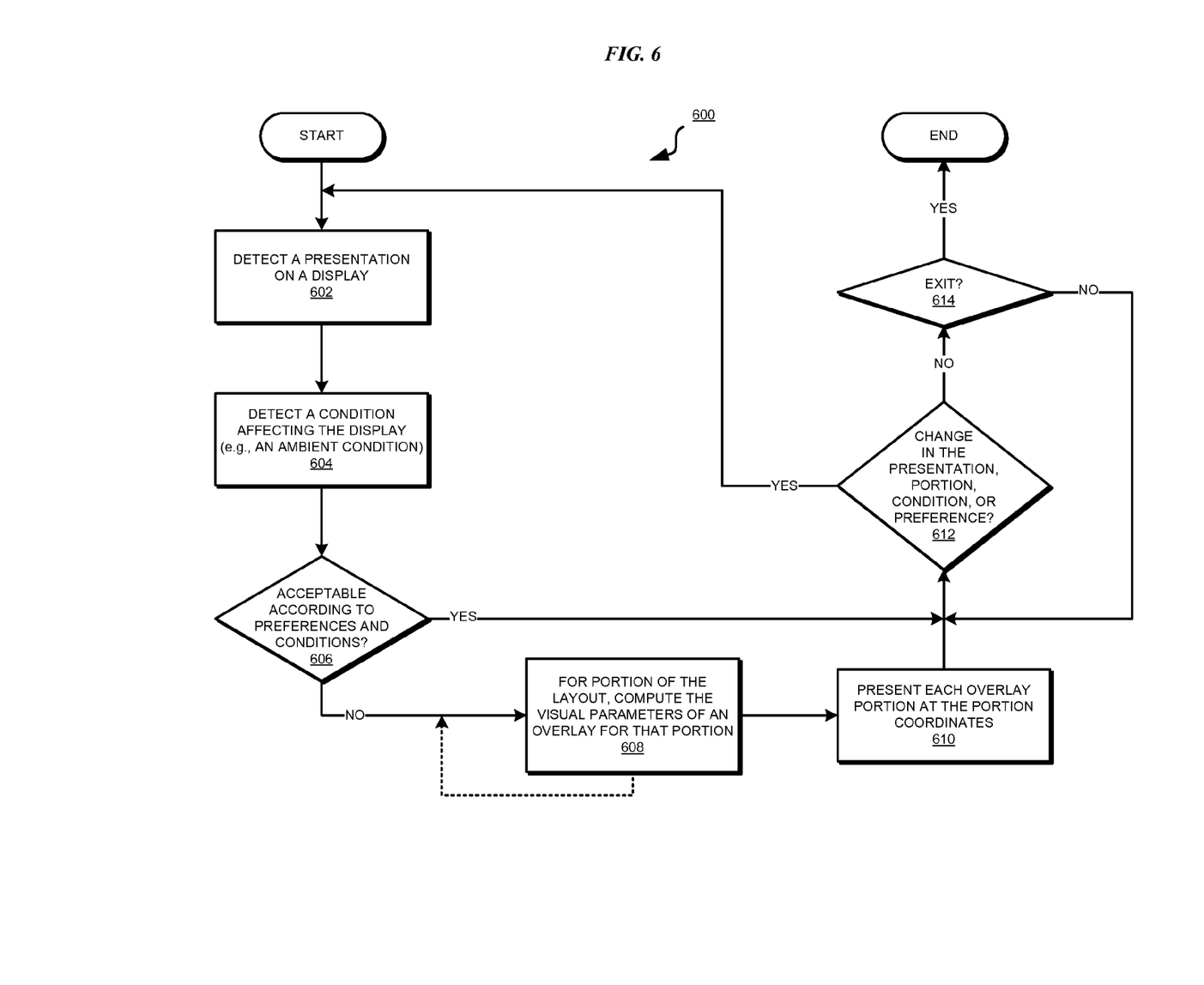
FIG. 6 depicts a process for creating and managing a dynamic display overlay in accordance with an illustrative embodiment.

With reference to FIG. 6, this figure depicts a process for creating and managing a dynamic display overlay in accordance with an illustrative embodiment. Process 600 can be implemented in application 502 in FIG. 5.

The application detects a presentation on a display (block 602). In an embodiment, the application detects a presentation that is about to be displayed on the display in block 602.

The application detects a condition affecting the display, e.g., an ambient condition (block 604). The application determines whether the visual characteristics of the presentation are acceptable within a threshold tolerance of a user preference, under the given ambient conditions (block 606). If the visual characteristics of the presentation are acceptable ("Yes" path of block 606), the application proceeds to block 612.

If one or more of the visual characteristics of the presentation are not acceptable ("No" path of block 606), the application computes the visual parameters of an overlay for a portion of the presentation (block 608). A visual parameter of the overlay comprises an adjustment applicable to a value of a visual characteristic of the portion of the presentation. The application repeats block 608 for as many portions of as many presentations as needed under given circumstances.

The application presents each overlay at coordinates computed from the portion coordinates (block 610). The application determines whether any change has occurred in the presentation, the portion, the condition, the user-preference, or a combination thereof (block 612).

If a change has occurred ("Yes" path of block 612), the application returns process 600 to block 602. If no change has occurred ("No" path of block 612), the application determines whether to exit (block 614). If process 600 should not exit ("No" path of block 614), the process returns to block 612. If process 600 can exit ("Yes" path of block 614), the application ends process 600 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for a dynamic display overlay. The overlay created by an embodiment is virtual, to wit, software generated visual artifact displayable using an electronic display device, and not a hardware component attached to the display device.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for creating a virtual display overlay, the method comprising:
    detecting, at a first time, a first value of a visual characteristic of a presentation, the presentation being sent to a display device from an application executing in a data processing system associated with the display device;
    detecting, at the first time, an ambient condition, wherein the ambient condition changes a user's perception of the first value of the visual characteristic to a perceived value of the visual characteristic;
    identifying a difference between the perceived value of the visual characteristic and a preference specified by a user;
    generating automatically, using a processor, responsive to the identifying, the virtual display overlay having an adjustment value, wherein the adjustment value when applied to the perceived value of the visual characteristic reduces the difference to less than a tolerance threshold;
    displaying the virtual display overlay on the display device such that the virtual display overlay covers the presentation.

2. The method of claim 1, further comprising:
    detecting, at a second time, a second value of the visual characteristic of a presentation;
    detecting, at the second time, a second ambient condition, where in the second ambient condition changes a user's perception of the second value of the visual characteristic to a perceived second value of the visual characteristic;
    identifying a second difference between the perceived second value of the visual characteristic and the preference;
    generating, responsive to the identifying the second difference, the virtual display overlay having a second adjustment value;
    changing the virtual display overlay on the display device according to the second adjustment value.

3. The method of claim 2, wherein the second value of the visual characteristic is unchanged from the first value of the visual characteristic.

4. The method of claim 2, wherein the second ambient condition is unchanged from the ambient condition.

5. The method of claim 2, wherein the changing the visual display overlay occurs automatically without a change in the preference.

6. The method of claim 1, wherein the displaying further causes the presentation to appear to have an adjusted perceived value of the visual characteristic, wherein the adjusted perceived value of the visual characteristic is within the threshold tolerance of the preference.

7. The method of claim 1, wherein the presentation is a portion of a visual interface of the application used to present visual information on the display device.

8. The method of claim 1, further comprising:
    detecting, at the first time, a value of a second visual characteristic of a second presentation, the second presentation being sent to the display device from a second application executing in the data processing system associated with the display device;
    determining, according to the ambient condition, a perceived value of the second visual characteristic;
    identifying a second difference between the perceived value of the second visual characteristic and the preference;

generating, responsive to the identifying the second difference, a second virtual display overlay having a second adjustment value, wherein the second adjustment value when applied to the perceived value of the second visual characteristic reduces the difference to less than a tolerance threshold;

displaying the second virtual display overlay on the display device such that the second virtual display overlay covers the second presentation.

9. The method of claim 1, further comprising:
detecting, using a sensor, a temperature of an ambient light in a vicinity where the display device is positioned, wherein the ambient condition comprises the temperature of the ambient light, wherein the temperature corresponds to a color of the ambient light.

10. The method of claim 1, further comprising:
detecting, using a sensor, an intensity and a temperature of an ambient light in a vicinity where the display device is positioned, wherein the ambient condition comprises a color of the ambient light, wherein the color of the ambient light corresponds to the temperature of the ambient light adjusted for the intensity of the ambient light.

11. The method of claim 1, wherein the detecting further comprises:
detecting the presentation in a memory associated with a graphics processing circuit, wherein the detecting the presentation in the memory occurs before the presentation is displayed on the display device.

12. A computer usable program product comprising a computer usable storage device including computer usable code for creating a virtual display overlay, the computer usable code comprising:
computer usable code for detecting, at a first time, a first value of a visual characteristic of a presentation, the presentation being sent to a display device from an application executing in a data processing system associated with the display device;
computer usable code for detecting, at the first time, an ambient condition, wherein the ambient condition changes a user's perception of the first value of the visual characteristic to a perceived value of the visual characteristic;
computer usable code for identifying a difference between the perceived value of the visual characteristic and a preference specified by a user;
computer usable code for generating automatically, using a processor, responsive to the identifying, the virtual display overlay having an adjustment value, wherein the adjustment value when applied to the perceived value of the visual characteristic reduces the difference to less than a tolerance threshold;
computer usable code for displaying the virtual display overlay on the display device such that the virtual display overlay covers the presentation.

13. The computer usable program product of claim 12, further comprising:
computer usable code for detecting, at a second time, a second value of the visual characteristic of a presentation;
computer usable code for detecting, at the second time, a second ambient condition, where in the second ambient condition changes a user's perception of the second value of the visual characteristic to a perceived second value of the visual characteristic;
computer usable code for identifying a second difference between the perceived second value of the visual characteristic and the preference;
computer usable code for generating, responsive to the identifying the second difference, the virtual display overlay having a second adjustment value;
computer usable code for changing the virtual display overlay on the display device according to the second adjustment value.

14. The computer usable program product of claim 13, wherein the second value of the visual characteristic is unchanged from the first value of the visual characteristic.

15. The computer usable program product of claim 13, wherein the second ambient condition is unchanged from the ambient condition.

16. The computer usable program product of claim 13, wherein the changing the visual display overlay occurs automatically without a change in the preference.

17. The computer usable program product of claim 12, wherein the computer usable code for displaying further causes the presentation to appear to have an adjusted perceived value of the visual characteristic, wherein the adjusted perceived value of the visual characteristic is within the threshold tolerance of the preference.

18. The computer usable program product of claim 12, wherein the computer usable code is stored in a computer readable storage medium in a data processing system, and wherein the computer usable code is transferred over a network from a remote data processing system.

19. The computer usable program product of claim 12, wherein the computer usable code is stored in a computer readable storage medium in a server data processing system, and wherein the computer usable code is downloaded over a network to a remote data processing system for use in a computer readable storage medium associated with the remote data processing system.

20. A data processing system for creating a virtual display overlay, the data processing system comprising:
a storage device including a storage medium, wherein the storage device stores computer usable program code; and
a processor, wherein the processor executes the computer usable program code, and wherein the computer usable program code comprises:
computer usable code for detecting, at a first time, a first value of a visual characteristic of a presentation, the presentation being sent to a display device from an application executing in a data processing system associated with the display device;
computer usable code for detecting, at the first time, an ambient condition, wherein the ambient condition changes a user's perception of the first value of the visual characteristic to a perceived value of the visual characteristic;
computer usable code for identifying a difference between the perceived value of the visual characteristic and a preference specified by a user;
computer usable code for generating automatically, using a processor, responsive to the identifying, the virtual display overlay having an adjustment value, wherein the adjustment value when applied to the perceived value of the visual characteristic reduces the difference to less than a tolerance threshold;
computer usable code for displaying the virtual display overlay on the display device such that the virtual display overlay covers the presentation.

* * * * *